I. & A. G. TOMPKINS,

Assignors to E. G. BLACK.

Machine for Grinding Shavings.

No. 9,383. Reissued Sept. 21, 1880.

WITNESSES.

V. D. Dearborn.

W. E. C. Whitney.

INVENTORS

Isaac Tompkins and

Abram G. Tompkins.

by Crosby & Gregory Attys

N. PETERS, PHOTO-LITHOGRAPHER, WASHINGTON, D. C.

UNITED STATES PATENT OFFICE.

ISAAC TOMPKINS AND ABRAM G. TOMPKINS, OF BROOKLYN, ASSIGNORS TO EDWARD G. BLACK, OF NEW YORK CITY, N. Y.

MACHINE FOR GRINDING SHAVINGS.

SPECIFICATION forming part of Reissued Letters Patent No. 9,383, dated September 21, 1880.

Original No. 189,399, dated April 10, 1877. Application for reissue filed April 2, 1880.

*To all whom it may concern:*

Be it known that we, ISAAC TOMPKINS and ABRAM G. TOMPKINS, of Brooklyn, in the county of Kings and State of New York, have invented a new and Improved Machine for Grinding Shavings, of which the following description, in connection with the accompanying drawings, is a specification.

Figure 1:
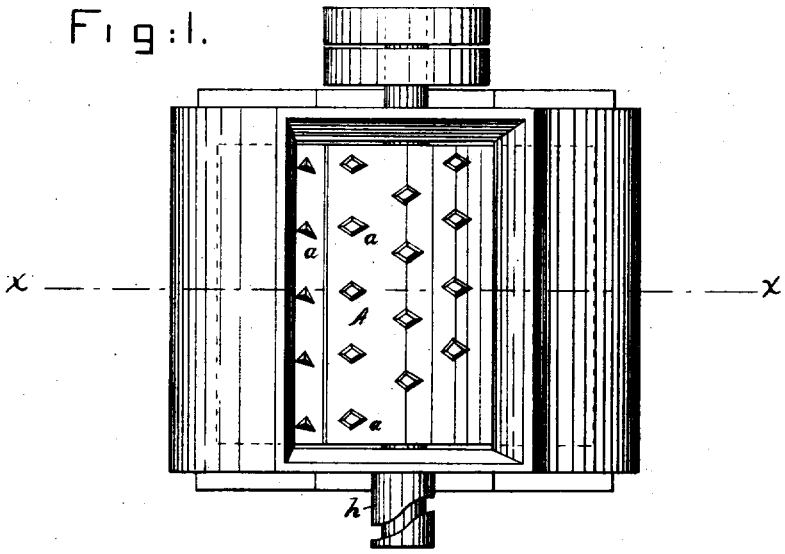
Figure 2:
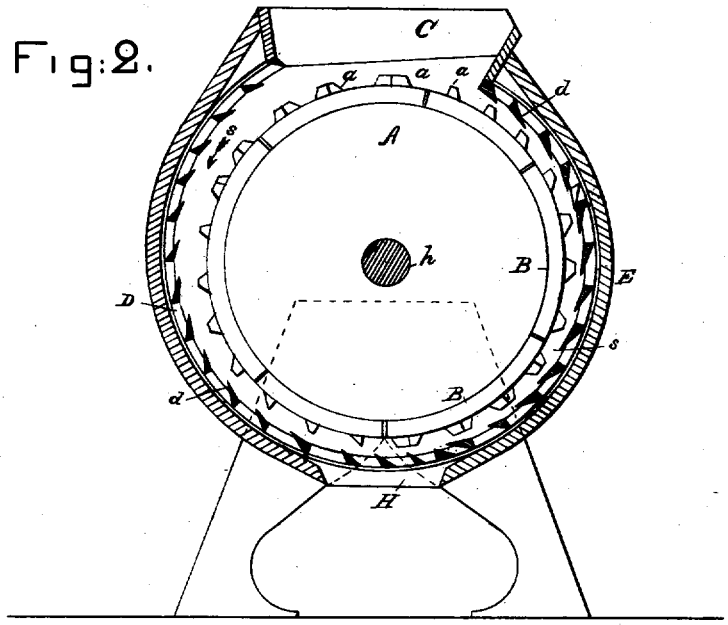
Figure 3:
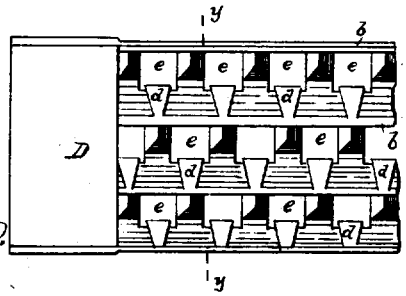
Figure 4:
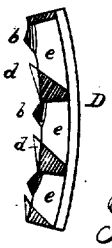

In the accompanying drawings, Figure 1 represents a top view; Fig. 2, a vertical transverse section on line *x x*, Fig. 1, of our improved machine for grinding shavings; and Figs. 3 and 4 are, respectively, a detail front view and a section on line *y y*, Fig. 3, of the inclosing cylinder or shell.

Similar letters of reference indicate corresponding parts.

Our invention consists, essentially, in a rotating grinding-cylinder provided with independent isolated cutting-teeth, located as hereinafter described, arranged within an inclosing shell or screen co-operating with said cylinder in effecting the reduction of the material being operated upon, and perforated for the discharge through it of the ligneous particles, the inclosing-shell being so shaped and located, as described, as to leave between it and the cylinder a space that gradually diminishes in width.

The small pieces or ligneous particles when sufficiently reduced by the operation of the machine pass through the perforations of the inclosing shell or screen into an exterior casing, from which they are conducted by a spout to a suitable receptacle.

The interior grinding-cylinder, A, on shaft *h*, revolved at suitable speed in any usual way, has a series of circumferential sections, B, (shown as provided with differently-shaped isolated grinding or cutting teeth or projections *a*, as shown in Figs. 1 and 2.) These sections may be provided with any suitable number and shape of teeth, by which the material fed into the hopper C may be cut or rasped reliably and speedily.

The revolving cylinder A is inclosed by the fixed shell D, (shown as provided with a series of perforations, *e*,) to permit the material cut or rasped between them to be discharged whenever fine enough to pass through said perforations.

The space between the periphery of the cylinder A and the interior of the shell D diminishes gradually in width, as shown in the section Fig. 2, the said space being viewed in the direction of the arrow, so that a considerable quantity of ligneous material to be cut into small pieces may be fed into the said space, the cutting being finer and finer as the area of the said diminished space is lessened, and this without the apparatus choking, for the cut or rasped material, as it is gradually broken finer and finer in the diminished space, falls through the perforations *e* of the shell or screen D. The material during its passage through the said diminished space is gradually reduced or broken into finer and finer particles.

The sections of which the shell or screen is composed, besides being provided with the perforations *e*, have longitudinal rows of cutting-teeth *b*, and also rows of chipping-teeth *d*.

The perforations *e* between the rows of teeth *b d* are of a size to correspond with the fineness it is desired the cut or broken material to have—the larger these perforations the coarser the discharged particles, and vice versa.

The shell D, besides acting as a screen, also, by its teeth, assists in cutting and breaking up the material. The pieces so cut pass gradually from the screen into the shell E and out through an opening, H; but the pieces not sufficiently reduced to pass through the perforations *e* are kept in motion by the cylinder, are carried over the same, and again fed, together with other quantities or portions of material, into the wider portion or mouth of the diminishing space, as just described.

The cylinder A may be either convexed or concaved, as it is desired to throw toward the center or ends the material being cut, the shell D being of corresponding shape.

By means of this machine shavings, which accumulate very rapidly in factories, may thus be rapidly cut or reduced into small pieces.

I am aware that a corn-sheller, patented November 28, 1859, No. 26,010, shows a cylinder provided with zigzag ribs, and the said cylinder is made to rotate within a casing having cast upon it longitudinal ribs with rounded tops, one part of the said casing having holes to discharge the corn, and between the said cylinder and casing there is a converging space.

Another corn-sheller, patented August 12, 1856, No. 15,502, contains a cylinder composed of a shaft having placed upon it side by side a series of toothed wheels, each tooth of each wheel being in a line longitudinally with one of the teeth of each one of the said toothed wheels, and said toothed wheels operate in connection with a series of curved toothed segments placed side by side and held by two rods, the said segments extending but partially around the cylinder and being adjustable toward and from the cylinder. In this last patent there are long slots between the segments for the discharge of the corn.

Neither of the corn-shellers is provided with teeth to cut and disintegrate the material passing between them, as is the case in this our invention, as that would be a fatal defect in a corn-sheller. In our machine the teeth on the cylinder are independent and isolated, and are so set that the teeth of one longitudinal row are placed opposite the spaces between the teeth of an adjacent longitudinal row of teeth, and the perforations and teeth of the shell are correspondingly located each with relation to the perforations and teeth of the adjacent rows of perforations and teeth.

I claim—

1. The combination of the rotating toothed cylinder provided with independent isolated cutting-teeth, arranged substantially as described, and the perforated shell constructed and arranged to co-operate with the toothed cylinder for the reduction of shavings, and located with relation to the periphery of toothed cylinder substantially as specified, to afford a gradually-diminishing space and permit the material cut into small pieces by and between them to be discharged when small enough to pass through the perforations of the said shell, substantially as set forth.

2. The combination of the rotating toothed cylinder provided with independent isolated cutting-teeth, arranged substantially as described, and the fixed perforated shell having cutting-surfaces and exit-perforations, the said shell forming with the cylinder an intermediate space that gradually diminishes in width, substantially as and for the purpose specified.

3. In combination, the case E, fixed perforated shell D, and rotating toothed cylinder, substantially as described.

4. The shell provided with alternate longitudinal cutting and chipping teeth *b d*, between which are arranged perforations *e*, as shown and described.

ISAAC TOMPKINS.
ABRAM G. TOMPKINS.

Witnesses:
WM. W. LADD, Jr.,
JULIUS WICLISLE.